Nov. 3, 1959

R. C. BODEM 2,910,966

ACTUATOR SEAL ASSEMBLY

Filed Jan. 20, 1958

INVENTOR.
Roy C. Bodem
BY
D.C. Staley
His Attorney

United States Patent Office 2,910,966
Patented Nov. 3, 1959

2,910,966
ACTUATOR SEAL ASSEMBLY
Roy C. Bodem, Dayton, Ohio, assignor to General Motors Corporation, Detroit, Mich., a corporation of Delaware Application January 20, 1958, Serial No. 709,904
7 Claims. (Cl. 121—38)

This invention pertains to actuators, and particularly to hydraulic actuators designed for use in high ambient temperatures.

Heretofore, it has been proposed to incorporate a self-cleaning orifice, in the form of a pressure drop bushing, between the rod and the cylinder of a hydraulic actuator. The pressure drop bushing permits a metered flow of fluid between the actuator chambers, which circulating fluid is used to cool parts of the actuator exposed to high temperatures. An actuator assembly of the aforesaid type is disclosed in copending application, Serial No. 648,361 filed March 25, 1957, in the name of Howard M. Geyer and assigned to the assignee of this invention.

The present invention relates to a rod end cylinder assembly for an actuator for the aforesaid type. Accordingly, among my objects are the provision of a rod end cylinder assembly for a high temperature actuator; and the further provision of an angular adjustable porting ring assembly for a hydraulic actuator.

The aforementioned and other objects are accomplished in the present invention by utilizing wedge means for retaining the porting rings in assembled relation with the cylinder. Specifically, the actuator comprises a cylinder having a reciprocable piston therein, the piston dividing the cylinder into an extend chamber and a retract chamber. Both the piston and the cylinder are restrained against rotation, and in the disclosed embodiment the cylinder is attached to a fixed support and the piston includes a rod which extends outside of the cylinder and is adapted for connection to a movable load. The rod end of the actuator cylinder includes a cylinder extension comprising a tubular member. A pressure drop bushing is disposed within the tubular member.

The pressure drop bushing is in the form of a spool having flanged ends, one of the ends having a plurality of axial slots therethrough. The inner diameter of the bushing is slightly greater than the diameter of the piston rod which extends therethrough. The tubular member has a pair of diametrically opposed ports therein which connect with a retract porting ring. The low pressure end of the pressure drop bushing is spaced from a nut by a plurality of metal spacers. The nut is locked in position by a pin, and is engaged by a spring retainer. A second spring retainer is axially spaced from within the tubular member, and a coil spring is interposed between the two spring retainers.

The end spring retainer engages an inner wedge shaped annulus of polytetrafluoroethylene. A steel reed is interposed between the wedge shaped surface of the inner seal and an outer wedge shaped annulus of polytetrafluoroethylene. The plastic wedge shaped seal members constitute a low pressure seal and are maintained in assembled relation by a washer and a nut which threadedly engage the tubular member. A second porting ring is attached to the end cap for receiving drain fluid which flows through the metered orifice between the pressure drop bushing and the piston rod. The porting rings can be held in any desired angular relation with the end cap by complementary wedge shaped sealing members and the nut.

Whenever a pressure differential exists between the opposed actuator chambers, a metered quantity of fluid will flow through the orifice between the pressure drop bushing and the piston rod, this circulating fluid being used to cool parts of the actuator exposed to high ambient temperatures. The internal actuator construction may be of the type set forth in the aforementioned copending application. The low pressure plastic seal is effective within the temperature range to which the actuator is subjected, namely 600°, to prevent leakage of the fluid from the system. Rubber seals cannot be used in an environment where the temperature exceeds 400° F.

Further objects and advantages of the present invention will be apparent from the following description, reference being had to the accompanying drawing, wherein a preferred embodiment of the present invention is clearly shown.

In the drawing:

Figure 1 is a view in elevation of an actuator embodying the rod end cylinder of this invention.

Figure 2 is a fragmentary view, partly in section and partly in elevation, depicting the novel cylinder end assembly of this invention.

Figure 3 is a perspective view of the pressure drop bushing embodied in the cylinder end assembly.

Figure 4 is a sectional view taken along line 4—4 of Figure 3.

With particular reference to Figure 1, an actuator is shown including a cylinder 10 having a head end cap 11 with an extend port coupling 12 therein. The head cap 11 includes a fixture 13 which may be attached to any fixed support, not shown. A reciprocable piston, not shown, is disposed within the cylinder 10, the piston being integral with a rod 14 which extends outside of the cylinder. The rod end of the actuator cylinder 10 includes a cylinder end assembly generally depicted by the numeral 15 which is attached to the cylinder 10 by a nut 16. The rod likewise includes a fixture 17 by which it is restrained against rotation and is attached to a movable rod device, not shown.

With particular reference to Figure 2, the novel cylinder end assembly will be described. The cylinder end assembly comprises an integral tubular member 20 having a radially outwardly extending flange 21 and an annular sealing groove 22. The nut 16 abuts the flange 21, suitable sealing means being interposed between the tubular member and the cylinder 10, the sealing means being disposed within the groove 22. A pressure drop bushing 23 is disposed within one end of the tubular member 20.

As seen in Figure 3, the pressure drop bushing 23 comprises a tubular member having end flanges 24 and 25 which define an annular groove 26 therebetween. The end flange 25 has four circumferentially spaced slots 27 therethrough. In the assembly, the flange 25 abuts an inner shoulder 28 on the tubular member 20 as seen in Figure 2.

The tubular member 20 is formed with a first set of four equally spaced circumferential ports 29, these ports communicating with the annular groove 26 in the pressure drop bushing 23. The ports 29 constitute retract ports through which hydraulic fluid is supplied or drained from one chamber of the actuator cylinder through the annular groove 26 and the slots 27.

The right hand end of the pressure drop bushing 23 is spaced from a lock nut 30 which threadedly engages an internal portion of the tubular member 20, by four spacers, two of which 31 have openings larger than the diameter of the piston rod 14, and the other two of which 32 engage the piston rod 14. The lock nut 30 is formed with nine radial holes 33 as shown in Figure 4.

The tubular member 20 is formed with a second set of circumferentially spaced radial ports, eight in number, as indicated by the numeral 34. The nut 30 is locked in position by a headed pin 35 which projects through one pair of aligned openings 34 and 33 as shown in Figure 4.

The inner diameter of the pressure drop bushing 23 is slightly larger than the outer diameter of the piston rod 14 so that a self-cleaning orifice is formed therebetween. This self-cleaning orifice, indicated by number 36, permits a metered amount of fluid to flow between the actuator chambers due to a pressure differential across the piston. This fluid, which may be utilized to cool parts of the actuator subject to high ambient temperatures, flows through the openings 33 in the lock nut 30 and thence through the drain ports 34 of the tubular member 20.

The cylinder end assembly also includes a low pressure seal assembly comprising a pair of nonmetallic annuli, composed of polytetrafluoroethylene, of wedge-shaped cross section. The inner annulus 37 sealingly engages the rod 14 and is formed with an internal groove 38 so as to form spaced sealing lips 39 and 40. The outer annuli 41 is formed with a plurality of annular grooves 42 so as to form a plurality of sealing lips 43 which engage the inner surface of the tubular member 20. The coacting inclined, or wedge-shaped surfaces, of the annuli engage a steel reed 44 which is disposed therebetween.

The seal members are held in assembled relation by a spacer 45 and a nut 46 which threadedly engages the exterior of the tubular member 20. The nut 46, as shown, is formed with a plurality of circumferentially spaced openings 47. The inner sealing annulus 37 is engaged by a spring retainer 48 against which one end of a coil spring 49 is seated. The other end of the coil spring 49 seats against a spring retainer 50 which abuts the lock nut 30. By tightening the nut 46, both the inner and outer annuli are forced into sealing engagement with the rod and tubular member, respectively due to the wedge-shaped surfaces therebetween.

The series of ports 29 and 34 in the tubular member 20 communicate with the porting rings 51 and 52, respectively. The porting ring 51 is formed with a pair of diametrically opposed threaded openings 53 and 55. The tubular member 20 has an external annular groove 57 communicating with ports 29. The groove 57 also communicates with openings 53 and 55 in the ring 51 irrespective of the angular position of the ring 51. The ring has wedged side walls 51a and 51b as shown in Figure 2.

The porting ring 52 is likewise formed with a pair of diametrically opposed threaded openings 54 and 56. The tubular member 20 has a second annular groove 58 which communicates with the ports 34 and the openings 54 and 56 in the ring 52. The ring 52 likewise has wedged side walls 52a and 52b. The porting rings 51 and 52 are held in assembled relation with the tubular member 20 by the nut 46. As seen in Figure 2, a wedge-shaped metallic sealing ring 59 is disposed between a complementary wedge-shaped portion of the porting ring 51 and the external shoulder 60 on the tubular member. A double wedge-shaped sealing ring 62 is disposed between the two porting rings. A third wedge-shaped member 63 is disposed between the porting ring 52 and the end of the nut 46. Thus, the nut 46 performs a dual function, namely maintaining the porting rings 51 and 52 assembled with the tubular member 20 in any desired angular position as well as applying a reaction force to the seal assembly so as to provide an effective low pressure seal.

From the foregoing it is apparent that the present invention permits the porting rings to be positioned in any angular position relative to the actuator cylinder so as to prevent interference between the conduits connected thereto. Moreover, the porting rings are held in the desired angular position by a nut which also applies force to the low pressure seal assembly.

While the form of embodiment of the invention as herein disclosed constitutes a preferred form, it is to be understood that other forms might be adopted.

What is claimed is as follows:

1. A rod and cylinder assembly for a hydraulic actuator having a cylinder with a reciprocable rod extending therefrom, including, a tubular member attached to the rod end of said cylinder, an externally grooved pressure drop bushing disposed within said tubular member adjacent one end thereof, said rod extending through said bushing, the inner surface of said bushing being radially spaced from the said rod to form a self-cleaning orifice therebetween, a low pressure seal adjacent the other end of said tubular member, a pair of spaced, angularly adjustable porting rings mounted on said tubular member connected respectively with said orifice and the external groove of said pressure drop bushing, and means for holding said porting rings in assembled relation with said tubular member and applying force to said seal.

2. A rod and cylinder assembly for a hydraulic actuator having a cylinder with a reciprocable rod extending therefrom, including, a tubular member attached to the rod end of said cylinder, a pressure drop bushing disposed within said tubular member adjacent one end thereof, said rod extending through said bushing, the inner surface of said bushing being radially spaced from the said rod to form a self-cleaning orifice therebetween, a first spring retainer disposed within said tubular member and reacting against said bushing, a second spring retainer spaced from said first spring retainer, a spring disposed between said spring retainers, a low pressure seal adjacent the other end of said tubular member engaging said second spring retainer, a pair of spaced angularly adjustable porting rings mounted on said tubular member, and means for holding said porting rings in assembled relation with said tubular member and applying force to said seal.

3. A rod and cylinder assembly for a hydraulic actuator having a cylinder with a reciprocable rod extending therefrom, including, a tubular member attached to the rod end of said cylinder, a pressure drop bushing disposed within said tubular member adjacent one end thereof, said rod extending through said bushing, the inner surface of said bushing being radially spaced from the said rod to form a self-cleaning orifice therebetween, a nut disposed within said tubular member and threadedly engaging the same, spacing means disposed between said nut and said bushing, a low pressure seal adjacent the other end of said tubular member comprising a pair of coacting wedge-shaped non-metallic annuli, one of which sealingly engages said tubular member and the other of which sealingly engages said rod, resilient means disposed between said internal nut and one of said annuli, and an external nut threadedly engaging said tubular member and reacting against the other of said annuli.

4. A rod and cylinder assembly for a hydraulic actuator having a cylinder with a reciprocable rod extending therefrom, including, a tubular member attached to the rod end of said cylinder, said tubular member having axially spaced sets of circumferentially ports, a pressure drop bushing disposed within said tubular member adjacent one end thereof comprising a spool with flanged ends, one end of said spool having a plurality of axially extending slots therethrough, one set of ports in said tubular member connecting with the grooves between the flanged ends of said bushing, the inner surface of said bushing being radially spaced from said rod to form a self-cleaning orifice therebetween, an internal nut disposed within said tubular member and threadedly engaging the same, said nut having a plurality of radial slots therethrough connecting with the other set of ports in said tubular member, spacing means between said nut and said bushing, and a low pressure seal adjacent the other end of said tubular member.

5. The assembly set forth in claim 4 including, a pair of angularly adjustable porting rings attached to said tubular member communicating with the ports therein, and means for attaching said porting rings to said tubular member including wedge-shaped metallic sealing rings and a nut threadedly engaging the exterior of said tubular member.

6. The assembly set forth in claim 5 wherein each porting ring comprises a metallic member having a pair of diametrically opposed threaded openings, and wherein said tubular member has an annular groove communicating with each porting ring.

7. The assembly set forth in claim 4 wherein the said nut is locked in position by a pin which extends through a port in said tubular member aligned with a slot in said nut.

References Cited in the file of this patent

UNITED STATES PATENTS

| | | |
|---|---|---|
| 1,776,974 | Henderson | Sept. 30, 1930 |
| 1,800,833 | Huff | Apr. 14, 1931 |
| 2,347,195 | Huff | Apr. 25, 1944 |
| 2,390,602 | Maier | Dec. 11, 1945 |